United States Patent
Petersen et al.

(10) Patent No.: US 8,488,240 B2
(45) Date of Patent: *Jul. 16, 2013

(54) POLARIZATION PRESERVING PROJECTION SCREEN WITH ENGINEERED PIGMENT AND METHOD FOR MAKING SAME

(75) Inventors: Joel Petersen, Valley Village, CA (US); Christopher Rich, Rancho Pales Verdes, CA (US); Raymond Jacob Lewandowski, San Diego, CA (US); Gary D. Sharp, Boulder, CO (US); David Coleman, Louisville, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,707

(22) Filed: Apr. 27, 2012

(65) Prior Publication Data

US 2012/0206800 A1    Aug. 16, 2012

Related U.S. Application Data

(63) Continuation of application No. 12/977,026, filed on Dec. 22, 2010, now Pat. No. 8,169,699.

(60) Provisional application No. 61/289,343, filed on Dec. 22, 2009.

(51) Int. Cl.
    *G03B 21/60* (2006.01)

(52) U.S. Cl.
    USPC .......................................... 359/452; 359/443

(58) Field of Classification Search
    USPC ..... 117/22; 359/443, 452; 427/194; 428/148; 430/321; 502/178
    See application file for complete search history.

(56) References Cited

U.S. PATENT DOCUMENTS

| | | | | |
|---|---|---|---|---|
| 2,524,286 A | * | 10/1950 | Dreyer | 359/487.02 |
| 3,652,317 A | * | 3/1972 | Della Porta et al. | 427/194 |
| 3,975,304 A | * | 8/1976 | della Porta et al. | 502/178 |
| 5,631,064 A | | 5/1997 | Marecki | |
| 5,672,410 A | * | 9/1997 | Miekka et al. | 428/148 |
| 6,369,944 B1 | * | 4/2002 | Zeira | 359/452 |
| 6,383,638 B1 | | 5/2002 | Coulter et al. | |
| 7,068,427 B2 | * | 6/2006 | Hopkins et al. | 359/443 |
| 8,194,315 B2 | | 6/2012 | Sharp et al. | |
| 2001/0005282 A1 | | 6/2001 | Etori et al. | |
| 2002/0034710 A1 | * | 3/2002 | Morris et al. | 430/321 |
| 2009/0190210 A1 | * | 7/2009 | Coleman et al. | 359/452 |

FOREIGN PATENT DOCUMENTS

| | | |
|---|---|---|
| JP | 10-104747 A | 4/1998 |
| JP | 10-206973 A | 8/1998 |
| JP | 2008-151815 A | 7/2008 |

OTHER PUBLICATIONS

International search report and written opinion of the international searching authority in co-pending PCT/US10/061944 mailed Sep. 16, 2011.

* cited by examiner

*Primary Examiner* — Clayton E Laballe
*Assistant Examiner* — Kevin Butler
(74) *Attorney, Agent, or Firm* — Baker & McKenzie LLP (57) ABSTRACT

Polarization preserving projection screens provide optimum polarization preservation for 3D viewing. The projection screens additionally provide improved light control for enhanced brightness, uniformity, and contrast for both 2D and 3D systems. Generally, the disclosed method for providing a projection screen comprises stripping an optically functional material from a carrier substrate, thus creating engineered particles from the optically functional material. The engineered particles may then be deposited on a second substrate to create a substantially homogeneous optical appearance of the projection screen.

44 Claims, 4 Drawing Sheets

POLARIZATION PRESERVING PROJECTION SCREEN WITH ENGINEERED PIGMENT AND METHOD FOR MAKING SAME

CROSS-REFERENCE TO RELATED APPLICATIONS

This application is a continuation of U.S. patent application Ser. No. 12/977,026, entitled "Polarization preserving projection screen with engineered pigment and method for making same," filed Dec. 22, 2010, which claims priority to U.S. Provisional Patent Application No. 61/289,343, entitled "Polarization preserving projection screen with engineered pigment," filed Dec. 22, 2009, the entireties of which are herein incorporated by reference.

TECHNICAL FIELD

The present disclosure generally relates to front projection screens, and more specifically, to polarization preserving front projection screens.

BACKGROUND

Modern 3-dimensional ("3D") cinema systems increasingly rely on polarization as a means of delivering stereoscopic imagery to an audience. Most of these systems place polarization control elements at both the digital projector and the viewer, which in practice makes the screen a contrast and/or cross-talk determining component. Manufacturers of front projection screens generally attempt to strike a compromise between image brightness uniformity and Polarization Contrast Ratio ("PCR"). Relative lack of efficiency of current screens (which has been described as Total Integrated Scatter or "TIS"), along with inherent light loss of most 3D delivery systems, further call for high peak gain to meet standards for image brightness. Conventional "silver-screens," however, have performance deficiencies that are the result of several statistical variables, which make it virtually impossible to optimize PCR, gain profile and efficiency.

BRIEF SUMMARY

According to the present disclosure, a web shuffling method for providing a projection screen may include stripping an optically functional material from a carrier substrate. The stripping may break the optically functional material into individual engineered particles. A coating may be distributed onto a second substrate to achieve a substantially homogeneous optical appearance of the projection screen, and the coating may include the individual engineered particles. Additionally, a base diffuser material may be fabricated and the base diffuser material may be adjacent to the optically functional material. The fabrication of the base diffuser material further comprises holding a predetermined tolerance, further wherein the predetermined tolerance is based on at least a difference between long-range statistics and ensemble statistics. The distributed coating may provide a surface that substantially approximates that of the base diffuser material.

Disclosed in the present application is a projection screen with a substantially homogeneous appearance, in which the substantially homogeneous appearance may be achieved through web shuffling. The projection screen may include a substrate and a coating adjacent to the substrate. The coating may be comprised of at least engineered particles which may be created by stripping an optically functional material from a carrier substrate. The engineered particles may be operable to primarily determine the scattering behavior of light. Furthermore, the morphology of the engineered particles may be operable to primarily, statistically determine the macroscopic scatter behavior of the projection screen. In one embodiment of the projection screen, the carrier substrate may be a sacrificial carrier substrate.

According to another aspect, the present application discloses a method for providing a projection screen. The method may include stripping an optically functional material from a first carrier substrate, creating engineered particles from the optically functional material and depositing the engineered particles on a second substrate to create a substantially homogeneous optical appearance of the projection screen. The method may also include utilizing a diffuser to provide the optically functional material, wherein the diffuser may be adjacent to the first carrier substrate. Additionally, a first optical coating may be deposited adjacent to the diffuser.

These and other advantages and features of the present invention will become apparent to those of ordinary skill in the art upon reading this disclosure in its entirety.

BRIEF DESCRIPTION OF THE DRAWINGS

Embodiments are illustrated by way of example in the accompanying figures, in which like reference numbers indicate similar parts, and in which.

DETAILED DESCRIPTION

Generally, one embodiment of the present disclosure may take the form of a method for providing a projection screen using web shuffling. In this embodiment, the method may be achieved by stripping the optically functional material from a diffuser carrier substrate, creating particles of a size appropriate for the selected coating technology, and re-coating the particles on a screen substrate. In one exemplary embodiment, the particles may be diffuser particles and may be substituted for ball-milled aluminum typically used in a conventional spray painting process. In another exemplary embodiment, a virtually deterministic engineered particle with prescribed scatter statistics may rely primarily on web shuffling for the randomization needed to create a substantially macroscopic homogeneous appearance. Other methods may be employed to achieve a substantially homogeneous appearance, for example, in U.S. patent application Ser. No. 12/976,986, entitled "Polarization preserving projection screen with engineered particle and method for making same," which claims priority to U.S. Prov. Pat. App. Ser. No. 61/289,346, filed Dec. 22, 2009, entitled "Polarization preserving projection screen with engineered particle," the entirety of which is herein incorporated by reference.

Another embodiment of the present disclosure may take the form of a projection screen. The projection screen may exhibit macroscopic scatter behavior primarily determined by the statistics associated with the morphology of individual particles that may be coated on the projection screen substrate. Using embossing technology (e.g. UV embossing), the particle slope probability statistics can be somewhat controlled, and may provide statistically self-contained units that have somewhat predictable scatter profiles, PCR and efficiency. This may lead to coating processes that may be substantially predictable in particle slope probability statistics. By greatly reducing the influence of the random processes discussed herein, surfaces may be made that decouple scatter profile shape/width from PCR.

Yet another embodiment of the present disclosure may take the form of a projection screen with a substantially homogeneous appearance which may be achieved via web shuffling. The projection screen may include a substrate which may be coated with an optically functional material that includes engineered particles. The engineered particles may be created by stripping a coating from a carrier substrate which may cause the coating to break into individual engineered particles, and then depositing the engineered particles on a projection screen surface to create a substantially homogeneous optical appearance of the projection screen.

It should be noted that embodiments of the present disclosure may be used in a variety of optical systems and projection systems. The embodiment may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

Before proceeding to the disclosed embodiments in detail, it should be understood that the invention is not limited in its application or creation to the details of the particular arrangements shown, because the invention is capable of other embodiments. Moreover, aspects of the invention may be set forth in different combinations and arrangements to define inventions unique in their own right. Also, the terminology used herein is for the purpose of description and not of limitation.

Figure 1:
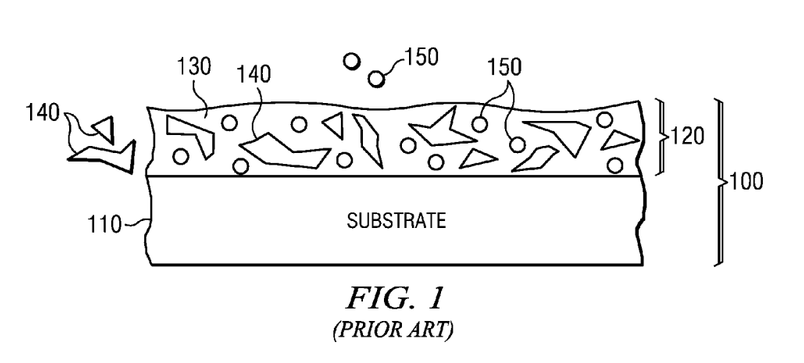
FIG. 1 is a schematic diagram illustrating the cross section of a conventional silver screen structure.

FIG. 1 is a schematic diagram illustrating the cross section of a conventional silver screen structure 100 used for stereoscopic 3D imaging. The conventional silver screen 100 may include a substrate 110 and a coating 120. Generally, conventional silver screen 100 may be fabricated by spray-painting the coating 120 onto the substrate 110. The coating 120 may include resin 130, aluminum flake 140 and matting agents 150. The flake 140 may be immersed in a transparent binder such as resin 130. Additionally, the aluminum flake 140 may be ball-milled aluminum particles or pigment. The matting agents 150 may be any type of particle to produce the desired optical characteristics and may be particles such as silica.

Various optical characteristics, either qualitative or quantitative, may be used to evaluate the optical performance of a projection screen such as the conventional silver screen 100. The optical characteristics may include measurements such as, but not limited to PCR, scatter profile, TIS, scattering from individual components of the projection screen, image brightness, image brightness uniformity, gain, gain profile and so on. The optical characteristics will be discussed in further detail below. The evaluation of conventional silver screens illustrates performance deficiencies with one or more non-optimized, aforementioned optical characteristics.

For example, conventional silver screens, generally, may demonstrate an on-axis circular PCR of 90:1 and may rarely exceed 120:1. The less than optimal on-axis circular PCR may be attributed to poor performance of the raw materials such as the substrate 110 and lack of process control when fabricating one or more of the coating 120, the aluminum flake 140 or resin 130. Additionally, the cross-talk term is characteristically angle neutral, so the PCR may also tend to degrade in proportion to the gain curve. The result may be screen performance that drives system level PCR and thus may dictate the quality of the stereoscopic 3D experience. System level PCR may be composed of the combined effect of most or all of the components. Currently, the system level PCR may be primarily determined by the screen PCR.

In FIG. 1, the individual components of the conventional silver screen 100 may contribute to the optical characteristics. For example, the aluminum flake 140 may consist of statistically scattering edge and sub-micron features as well as planar (e.g., specularly reflecting) features that when combined with the statistics of particle stacking may determine the macroscopic scatter characteristics of the conventional silver screen 100. Although low-cost ball-milled aluminum particles may beneficially broaden the scatter profile due to the relatively irregular shape/size of the aluminum particles, the aluminum particles may cause other issues from a polarization management perspective. When the previously-discussed issues are coupled with the statistics associated with the coating process, current screen manufacturing may lack the control required to increase the diffusion angle without compromising PCR. More specifically, as the probability of a highly sloped surface increases, so too does the probability of a secondary reflection event, with the PCR suffering as a consequence.

One aspect of the present disclosure addresses the previously-discussed limitations and may use a novel "web shuffling" technique in conjunction with roll-to-roll fabricated diffuser. Web shuffling is an averaging process, whereby engineered particles of a prescribed size may be transferred from a carrier substrate to a screen substrate using a statistical (or shuffling) process. According to the present disclosure, the shuffling process may be used to substantially homogenize one or more non-uniformities that may occur in the manufacturing of the raw diffuser stock. In one example, it may be understood that non-uniformities are substantially homogenized when the human eye cannot detect the non-uniformities at one or more of the following scales: just resolvable dimension, just resolvable area, just noticeable difference, and so on. Each of the particle size and morphology, or both, may be optimally selected such that each may provide a suitable approximation to the desired macroscopic scatter statistics. The particles may be manufactured using roll-to-roll embossing technology, which produces the improved optical quality reflective diffuser performance. The web shuffling of the present disclosure may allow for the elimination of the need to manufacture roll-to-roll embossed diffuser on a wide-web that is substantially defect-free and extremely uniform.

A technique involving web shuffling enables the substantial homogenization of subtle non-uniformities that can result in the tooling fabrication, roll-to-roll manufacturing process, and vacuum optical stack coating, without significantly sacrificing optical performance. The benefits of this approach for screen manufacturing can take many forms, including: (1) Spatially averaging large scale variations in diffuser profile characteristics; (2) Azimuthally averaging the effects of a directional diffuser (which can also vary spatially); (3) Randomization of diffraction artifacts resulting from periodic base-material, and (4) Spatially averaging (or removing) gross defect material, which can include one or more of drum seams, large facets, scuffs, and other macroscopic defects in the embossing and optical coating process.

A benchmark for stereoscopic 3D front projection screen performance is an engineered surface with a highly reflective (e.g., aluminum) conformal layer, as described in the commonly-owned U.S. Patent Application Publication No. US 2009/0190210, which is hereby incorporated by reference. An engineered surface can be generated directly from a surface map file or a set of design rules, and thus can in principle provide a virtually ideal scatter profile, PCR, and efficiency. However, the fabrication of such a surface in sufficient size to build a cinema screen can be challenging.

In one example, the fabrication of the previously-discussed surface may involve fabricating and maintaining a roll-to-roll embossing tool that may have one or more of the following features: 1) no drum seams or no substantially significant drum seams; 2) no gross defects or substantially insignificant gross defects, either of which would avoid producing repeating screen artifacts (e.g., voids that produce mirror-like facets); and/or 3) a prescribed topography that is statistically uniform over the entire tool. In order to avoid visually objectionable diffraction artifacts and moire, a design may also incorporate feature randomization (versus a true periodic structure on the roll-to-roll embossing tool). Moreover, the scatter statistics at the web edges should be well matched, so that butt-joined strips of film do not produce substantial visible intensity steps (when observing from most or all locations in a theatre).

Given the scale and cost of the raw diffuser stock, acceptable yield may be obtained if cosmetic defects resulting from the manufacturing and handling of the material are virtually eliminated. Tighter statistics can be obtained by using higher quality leafing pigments, which are optically flatter and tend to align in the plane of the binder surface. However, surfaces made with optical quality flat metallic leafing pigments have inherently narrow scatter profiles (e.g., 5-15 degree half-power angle), producing screens with higher TIS, but poor brightness uniformity as a function of viewing angle. Furthermore, techniques for broadening the scatter profile of optical quality pigment by controlling the extent of leafing often lack manufacturing robustness. Although a non-leafing pigment may be used, non-leafing pigment typically produces more of a bulk scatter, which is difficult to control and is again at the expense of PCR. Importantly, web shuffling in conjunction with roll-to-roll fabricated diffuser may address the limitations of both these technologies.

Figure 2:
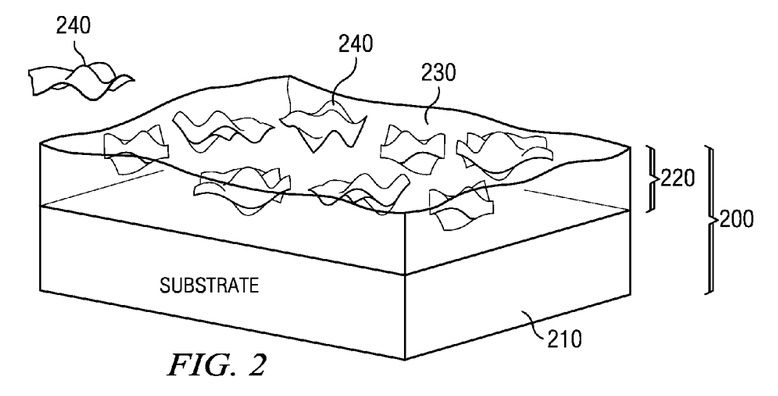
FIG. 2 is a schematic diagram illustrating a cross section of one embodiment of a structure for a projection screen, in accordance with the present disclosure.

FIG. 2 is a schematic diagram illustrating a cross section of one embodiment of a structure for a projection screen 200. The web-shuffled flake screen 200 may include a substrate 210 and a web-shuffled coating 220. The web-shuffled coating 220 may include a fluid 230. The fluid 230 may contain a transparent binder resin such as, but not limited to PVC resin, enamel, polyurethane, acrylic, lacquer, and the like, and/or some form of dilution, which can be either solvent aqueous-based. The fluid 230 may serve as a carrier for the flake particles 240. The flake particles 240 may be engineered aluminum flakes or particles created from at least one or more of a diffuser, a reflective coating and multiple optical coatings. Additionally, the flake particles 240 may overlap one another on the substrate 210. In one embodiment, the flake particles may substantially cover most or all of the surface of substrate 210. The fabrication of the web-shuffled flake screen 200 will be described in detail below with reference to FIG. 3.

Figure 3:
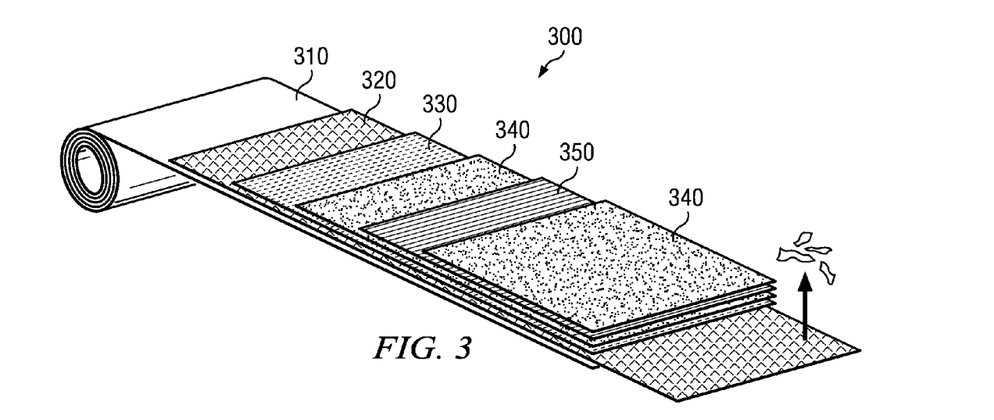
FIG. 3 is a schematic diagram illustrating a perspective view of one embodiment of a process for providing flake particles, in accordance with the present disclosure.

FIG. 3 is a schematic diagram illustrating a perspective view of one embodiment of an apparatus 300 used in a process for providing the flake particles 240 described in FIG. 2. Apparatus 300 may include a substrate 310, a diffuser 320, a release layer 330, optical coatings 340, and a reflective layer 350. The diffuser 320 may be fabricated from an initial continuous surface (not depicted in FIG. 3). Additionally, the initial continuous surface and diffuser 320 of FIG. 3 may be measured and evaluated using similar functional specifications, each of which will be discussed below. Furthermore, the fabrication of the initial continuous surface will be discussed in further detail below.

The light scattering behavior of a surface fabricated according to the present disclosure is the result of several statistical processes. Generally, the compound statistics are the result of three manufacturing process steps; (1) Fabrication of the initial continuous surface, (2) Fabrication of discrete surface elements, and, (3) Deposition of discrete surface elements. The following describes the fabrication processes and the parameters influencing first-order statistics, as well as embodiments that most closely approximate the behavior of the ideal surface.

Fabrication of Initial Continuous Surface

The initial continuous surface may be fabricated using a number of manufacturing processes that substantially produce a predetermined topography. The preferred topography may be optically smooth, with slopes that vary spatially on a scale that is large relative to a wavelength of illuminating radiation. In one embodiment, the initial surface may be mastered using an analog photo-resist process, from which manufacturing tooling may be generated. The fabrication of the manufacturing tool may also include intermediate tooling steps in addition to the analog photo-resist process. Additionally, there may be certain limitations to the nature of surfaces and associated statistics that may be realized when employing the analog photo-resist process, as in the case of optical recording of speckle patterns. In another example, direct laser-recorded analog photo-resist processes may permit surfaces to be engineered, with fidelity limited primarily by the resolution of the laser spot and the characterization/repeatability of the optical recording transfer function.

Functional Specifications of Initial Continuous Surface and Diffuser

Design rules for achieving optimal performance for continuous surfaces (subject to specific theatre geometry) and as described in U.S. Pat. App. Pub. No. 2009/0190210 may be applied to produce the initial surface. In the case of a polarization-preserving front projection screen and also as described in U.S. Pat. App. Pub. No. 2009/0190210, the desired functional specifications are well defined. In principle, so long as the functional specifications are substantially satisfied, the detailed distribution of surface topography is of no specific importance. The functional specifications may include, but are not limited to, PCR, gain profile shape, and visual appearance. The exception may include designs incorporating azimuth dependence, which is lost in the web shuffling process. Some basic characteristics (which may be the same as the functional specifications) of desired surfaces are described herein.

For naturally occurring diffuser surfaces, for example non-engineered surfaces, the characteristics are frequently determined by physically measuring the bi-directional reflectance distribution function ("BRDF"), representing the differential reflectivity per solid angle. Such measurements can also be made with polarization sensitivity, giving a PCR profile. When a BRDF measurement is made over a sampling area that is large relative to the mean feature size of a scattering unit, the result may be a relatively smooth profile. Many such surfaces may have the desirable characteristics of a matte appearance and nearly Lambertian distribution, as the light collected by the eye is the result of many scattering events from features that are at/below the wavelength scale. This randomization may be beneficial by creating a uniform appearance (which may include elimination of optical effects due to the spatial coherence of the source at the screen), but may inefficiently use light, and may have a negative impact on polarization preservation.

For the subset of diffuser surfaces that preserve polarization well, there may be a close correspondence between the slope probability density function and the BRDF. This is because virtually all light reflected by the diffuser is the result of single scattering events. A viewer receives light from appropriately oriented contours of the surface which represent mirror-like specular reflections. To the extent that the angles are reasonably small (so that the differences between complex S and P reflections can be neglected), such interactions completely preserve the state of polarization locally. Also, selection of feature size and distribution may be important to avoid the grainy appearance (particularly at large observation angles) associated with low spatial density of appropriately sloped surface. This may also be an important consideration in the specular direction, where superposition of partially coherent light can cause speckle. One aspect of the present disclosure seeks to utilize web shuffling to capitalize on the surface control available in processes, such as UV embossing, UV casting, thermal embossing and so on, for creating optimized surfaces. UV embossing may be desirable method to reproduce fidelity.

Fabrication of Discrete Surface Elements

According to one aspect of the present disclosure and returning to FIG. 3, the diffuser 320 may be diffuser roll-stock and may be fabricated using various processes such as, but not limited to roll-to-roll UV embossing, UV casting, thermal embossing and so on. The embossing process may be followed by vacuum deposition of optical coatings or layers. As depicted in FIG. 3, the optical coatings or layers may include a release coating 330. In an exemplary embodiment, four thin-film layers may be included such as the release coating 330, optical layers 340 and reflective layer 350. One purpose of the release coating 330 may be to facilitate the stripping of the optical layers 340 and reflective layer 350 in a subsequent step, in a manner that may leave substantially no residue or surface roughness, as described in U.S. Pat. No. 5,672,410, which is hereby incorporated by reference. The optical layers 340 may form a sandwich structure, and may be transparent dielectric films bounding a reflective layer 350. The reflective layer 350 may be a highly reflective metal layer. In one embodiment, the optical layers 340 may be dielectric layers and the reflective layer 350 may be an aluminum layer. The dielectric layers may serve to passivate the aluminum and may preserve the mechanical integrity of the structure in subsequent process steps, as described in, for example, U.S. Pat. No. 6,383,638, which is hereby incorporated by reference. In the absence of the mechanically balanced sandwich structure, released particles may curl and wrinkle, thus distorting the particle slope probability density function. Moreover, the sandwich structure may be better able to withstand the violent process of stripping, sizing, coating, and drying, without deformation and further reductions in particle size statistics, which may have negative impacts to screen performance.

In one embodiment, optical layers 340 may be dielectric layers (e.g., $SiO_2$, $SiO$, $SiO_x$, $MgF_2$ and so on) and may have an important function in the formation of particles. Although ductile fracturing of raw aluminum may result in changes to particle slope statistics, the dielectric layers may facilitate brittle fracture, due to the dielectric property of high compressive strength relative to tensile strength. The first dielectric support layer which may be adjacent to the diffuser, may be coated in such a way that it will crack along random contours of the diffuser structure, which in the absence of further measures, may ultimately produce a broad spectrum of particle sizes. In one example, the initial dielectric support layer may be formed via deposition in a direction normal to the substrate 310, such that the initial dielectric support layer may be relatively thin in highly sloped regions. It is therefore possible that the initial dielectric support layer may be relatively weak, and thus, may crack where slopes are highest.

The initial stripping process may involve, for example, immersing the film in an ultrasonic bath containing a solvent. Typically, this may produce particles that are too large for a spraying process and the particles may be subsequently sized down. Examples of sizing processes may include, but are not limited to, grinding, jet milling, or any high speed collision of the particles with a hard surface (or each other) that can be used to break the particles further. Depending upon a number of process parameters, the mean particle size may be selected, even though the spread in the particle size spectrum may be typically quite broad. Without further processing and selection of the mean particle size, the spread in the particle size spectrum can limit the potential performance of the resulting screen. In one example, using conventional spray-painting processes, extremely large particles may need to be eliminated in order to avoid clogging the gun. A clogged gun reduces manufacturing throughput, and may limit the quality of the product due to spatter and large macroscopic clumps that may degrade the cosmetic quality of the screen. Additionally, small particles can uniformly destroy both the desired scatter profile and the PCR through mechanisms discussed subsequently.

The formation of discrete diffuser particles via stripping may represent a second statistical process. The stripping process may affect the resulting screen behavior largely through the statistics of particle size, and in particular, the size of the diffuser particles relative to other significant features. The stripping process may also liberate the optically functional layers from the supporting diffuser sheet, thus erasing memory of the particle orientation (including sign of surface normal vector) with respect to the substrate. Thus, while the stripping and coating process steps may be statistically coupled, the general contribution of particle orientation may be primarily attributed to the coating process step.

Figure 4:
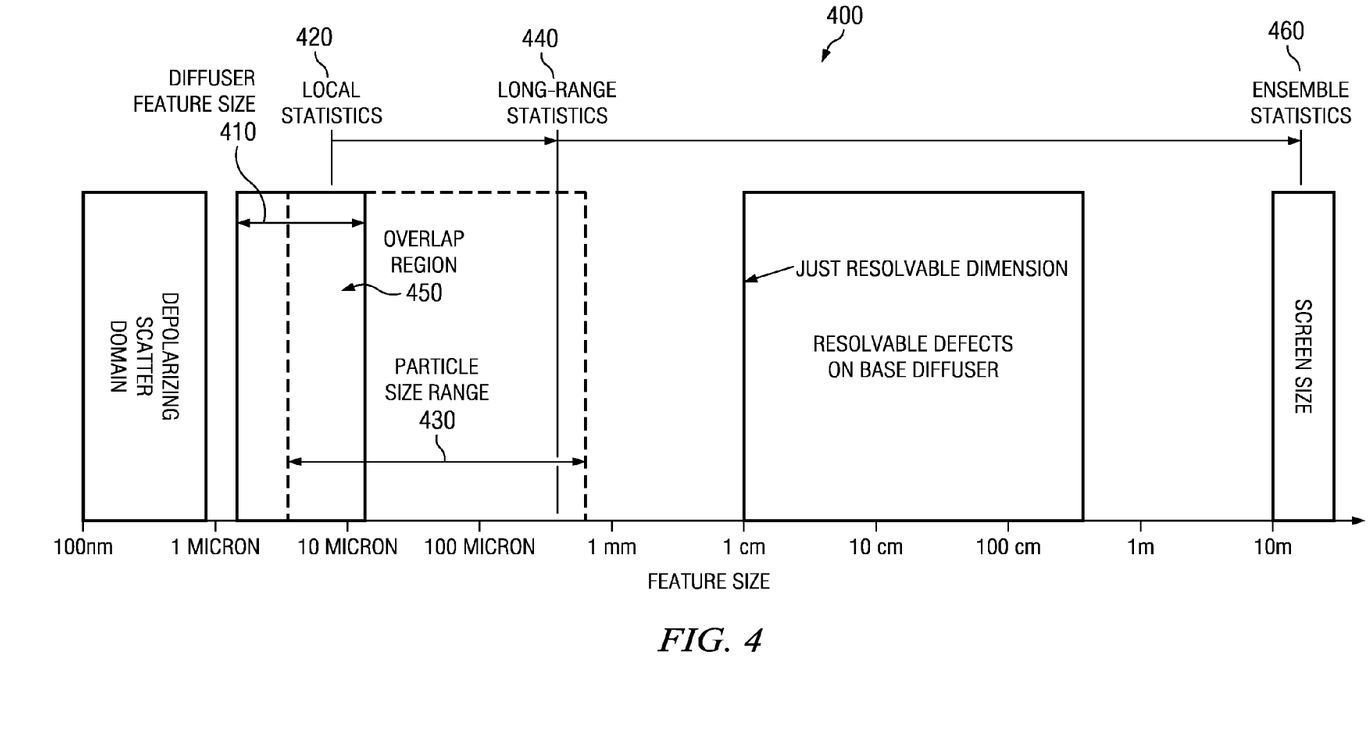
FIG. 4 is a schematic diagram illustrating a spectrum of feature sizes and the ranges associated with particular screen characteristics, in accordance with the present disclosure.

FIG. 4 is a schematic diagram illustrating a spectrum 400 of feature sizes and the ranges associated with particular screen. Diffuser feature size 410 may be configured to be significantly larger than a wavelength of illuminating radiation in order to assure that polarization can be locally preserved in reflection as indicated by the local statistics range 420. Above this limit (this limit may refer to the length scale approximately one micron above which reflection happens specularly and below which light is scattered; e.g., not determined by Frensel, but instead determined by diffraction), interactions of light with the surface are described by specular reflections in the long range statistics 440, with behavior appropriately predicted by Fresnel's equations. When probing a surface at the long-range statistics 440 scale (and moderately above), statistical scatter profiles are sparsely distributed (converging to the deterministic at the extreme low-end) as they represent localized events. As the probe area increases, the scatter statistics become more complete and thus begin to describe the character of the macroscopic surface.

The spectrum 400 assumes a surface containing a random distribution of diffuser feature sizes, where a deterministic structure (e.g., a lenslet array) would have a much narrower distribution. Spectrum 400 also shows one possible typical distribution of a particle size range 430, which may vary significantly with the diffuser feature size 410 distribution. In one embodiment, minimal overlap of these distributions may be preferred, and in the optimized case, the distributions may be significantly separated. The overlap region 450 represents the range over which diffuser feature size and particle size may be comparable, and in some instances, a particle may comprise only a portion of a single diffuser feature.

According to an exemplary embodiment, the particle size may be significantly larger than the largest diffuser feature size, and as such, the statistics may become more complete. Such particles may comprise the vast majority of the pigment used to coat the screen. The smallest scale at which a robust representation of the macroscopic surface is attained may be associated with long-range statistics 440. Within the long-range statistics 440, the scatter profile may be smooth and may be virtually indistinguishable from that measured by probing significantly larger areas. For a surface having random sized diffuser features, the scale at which long-range statistics are captured may be significantly larger than the largest particle size. While this situation may be less than ideal, it is common when considering the practical limitations of pigment size. If the surface is deterministic, it may be feasible to capture long-range statistics at a much smaller scale. Regardless, the gap between particle size and long-range statistics may be preferably minimized.

At still larger scales, such as the range of ensemble statistics 460, the screen viewing conditions may be such that any non-uniformity in the screen is visually resolvable, and would therefore be objectionable. Such non-uniformities, also referred to as screen structure, typically may be observed as a random noise image, or fixed-pattern noise, which can detract from the quality of both 2D and 3D presentations. Screen structure may manifest itself as a subtle modulation in the observed intensity, as well as a localized loss in PCR, depending upon the spectrum of feature sizes associated with the artifact. At this scale and larger, there may exist visually resolvable coating defects, drift, and distortions to the scatter profile, due to lack of process control in manufacturing both the tooling and the base material. Moreover, the diffuser can have directionality, which can also drift spatially. Note that the nature of this defect may be a low-contrast macroscopic disruption in the gain, versus a point defect, for instance, a defect associated with hot-spotting. As will be discussed herein, relatively-small point defects of very high contrast may produce sharp changes in gain that are also unacceptable.

The ensemble statistics 460 may represent substantially all possible outcomes, which in this context, may be measured at the scale of the finished screen. Ensemble statistics 460 may be associated with both the raw diffuser used to create the pigment (prior to stripping), and the final coated screen. The degree to which raw diffuser and finished screen ensemble statistics resemble each other may be highly dependent on relative feature size, as will be discussed in detail below.

According to an exemplary embodiment, a particle may be large enough to capture long-range statistics subject to the limitations of the uniformity of the embossing process, but the particle may be smaller than any visually resolvable defect requiring homogenization. Given the limitations on the upper limit of pigment size, the former may be difficult to satisfy, while the latter may be straightforward in a cinema environment. Additionally, web shuffling may further be useful in homogenizing smaller defect features that, while not visually resolvable, may represent large disruptions in the intensity. For instance, voids may be produced in various process steps such as, but not limited to, UV embossing or tool manufacturing due to bubbles, which when metalized, produce highly reflective facets in the plane of the substrate. While such defects may be small (on the order of a few hundred microns, for example), nearly all of the incident radiation is re-directed along the specular direction. The result is an abrupt spike in intensity (or sparkle) that upsets the homogeneity of the image, and thus degrades the appearance. Such facets are on a relatively dim background diffuser, which redirects incident light into a broad solid angle, in accordance with the BRDF.

Figure 5A:
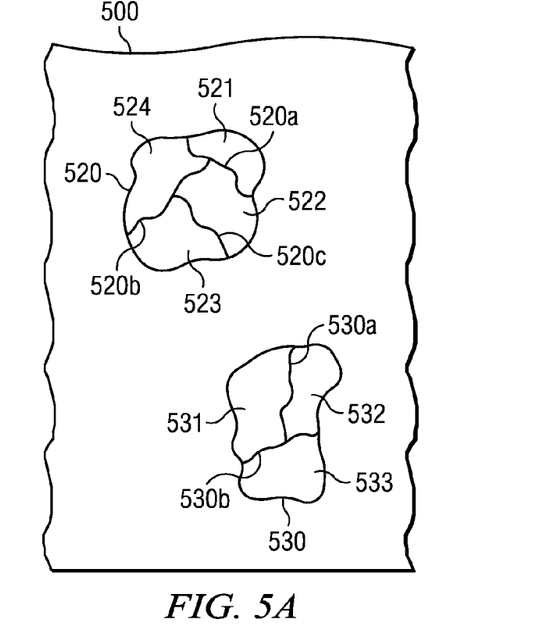
FIG. 5A is a schematic diagram illustrating an embodiment of a defect before web shuffling, in accordance with the present disclosure
Figure 5B:
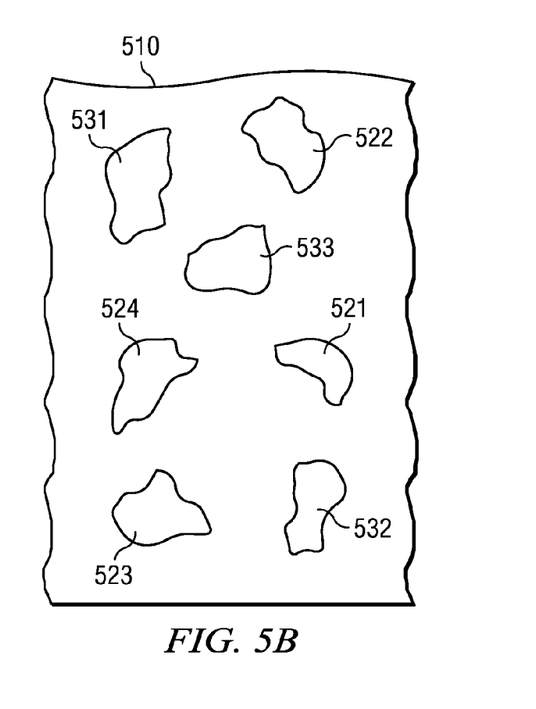
FIG. 5B is a schematic diagram illustrating an embodiment of a defect after web shuffling, in accordance with the present disclosure.

FIGS. 5A and 5B are schematic diagrams respectively illustrating one embodiment of a defect before and after web shuffling. For instance, FIG. 5A shows defects on substrate 500 before web shuffling, and FIG. 5B shows defects on substrate 510 after web shuffling (not illustrated to scale). On substrate 500 (before web shuffling), defects or individual facets 520, 530 may be several hundred microns in diameter, and as such, can potentially be homogenized by web shuffling. Individual facet 520 includes fracture lines 520*a*, 520*b*, 520*c* to produce flake particles 521, 522, 523 and 524. Likewise, individual facet 530 includes fracture lines 530*a* and 530*b* to create flake particles 531, 532 and 533. Although the material surrounding individual facets 520 and 530 may also be fractured, for purposes of discussion, only the fracture lines in the individual facets are illustrated in FIG. 5A. After web shuffling, substrate 510 includes flake particles 521, 522, 523, 524, 531, 532 and 533 randomly distributed on the substrate 510.

While defects as illustrated in FIG. 5A may not be completely eliminated at the particle scale, reducing the area of facets can mitigate the impact on visual quality. At a larger scale, clusters of such defects, and clusters that repeat due to flaws in tool manufacturing, may be likewise homogenized. Clusters of small specular facets are often associated with the hot-spot effect, which may manifest as a spike in the gain profile along the specular direction. Release of the particles from the substrate and re-coating may provide sufficient tilt randomization to substantially eliminate this effect.

In another exemplary embodiment, scatter profiles measured on the scale of a visually just-resolvable-area ("JRA") of the finished screen material may virtually capture the ensemble statistics of the raw diffuser. A goal of web shuffling may be to reduce the scale required to capture ensemble statistics by averaging material in azimuth and position at the scale of a JRA. In a cinema environment, the average scale may be on the order of 1 cm or larger for low-contrast structure.

According to another exemplary embodiment, differences between long-range statistics and ensemble statistics may be substantially held to a predetermined tolerance in the manufacturing of the base diffuser material. To reduce or avoid unnecessary texture in the appearance of the finished screen, it may be preferred that the observed intensity step between any two adjacent particles of the ensemble (with any relative azimuth orientation) is below a just-noticeable-difference ("JND"). At the extreme of (large) visually resolvable particles, this may be approximately one percent of the mean intensity. In one example, a particle may be much smaller than a JRA, which may tend to loosen the target uniformity. Moreover, even if such steps greatly exceed a JND, it may be tolerable provided that the texture is subtle, and again, the particles are small with respect to a JRA. Such is the case for typical pigment size distributions, observed in a cinema environment.

A useful performance metric may be the ratio of particle area to mean diffuser feature area, or particle-to-feature-ratio ("PFR"). The PFR is a direct measure of the ability of a particle to capture long-range diffuser statistics. The PFR may also be an indirect measure of the particle aspect ratio (ratio of average particle in-plane dimension to peak-to-valley thickness) and the probability of a particle preserving orientation when transferred from carrier substrate to screen substrate. Specifically, the original diffuser typically satisfies the desired scatter requirements using surface peak-to-valley heights that are small (roughly 20%) relative to in-plane dimensions. A particle with a large PFR thus has a large aspect ratio. Such particles have the appearance of bumpy wafers, which tend to stack so as to best preserve the original slope probability density function in the coating process. Thus in general, a large PFR may be preferred in order to ultimately realize the benefits of a structured particle.

For random surfaces, each particle samples the ensemble, and thus each particle may provide a unique and incomplete representation of the surface statistics. Statistics are more complete when the PFR is larger, and therefore a particle comes closer to faithfully representing the original surface. This argues for the largest possible particles (provided that the particles are not distorted/broken during subsequent processing, and provided the particles are still small with respect to a JRA), with the smallest diffuser features possible. In conventional spray-painting processes, there are limitations to maximum particle size before coating difficulties can arise. Extremely large particles are eliminated or they clog guns, producing macroscopic artifacts and decreasing manufacturing throughput. In conventional painting processes, an approximate size range may be up to 200 microns with 50 microns more preferable. In one embodiment, painting processes may include particles sizes exceeding 300 microns.

Additionally, the minimum feature size possible may depend upon the optical recording process. In an image recording process (e.g., speckle), there may be challenges to resolving very small speckles due to the quality of the imaging system and opto-mechanical stability issues. Vibrations that occur during recording may tend to impact the quality of the master due to blur. However, it is reasonable to expect that mean feature sizes of approximately five microns may be possible with either image (e.g., speckle) recording or direct laser written engineered surfaces. A PFR of roughly 100 should be adequate to capture most of the statistics of a randomized surface. But there remains an issue that the particle size spectrum is quite broad with fracturing of random surfaces, resulting in a significant number of particles (fines) that are on the order of a feature size, or even smaller.

In the case of recording arbitrarily small features, the lower limit may be approximately one micron, which may ensure that polarization is preserved on reflection. It may be difficult, however, to employ the lower limit with the coating of discrete particles due to the influence of hard edges. A crossed-polarizer microscope measurement allows one to visualize the PCR directly on the surface to identify the source of crossed polarizer leakage. In a crossed-polarizer microscope arrangement, individual particles appear brightly outlined, as if the image of the diffuser surface were high-pass spatial filtered. The scatter from edges is generally "white" in angle space, such that this contribution to the resulting PCR tends to follow the gain profile Metal flake pigments typically contain a significant population of low PFR particles, which may contribute significantly to the density of such edges, thus causing significant loss in PCR. With an optimized coating process, PCR tends to grow with particle size due to the associated reduction in the area density of edges.

There are two primary benefits to controlling the particle size distribution in manufacturing. The first is improvement in particle statistics that impact the screen performance, and the second is improvement in pigment yield, which drives cost. According to one embodiment of the present disclosure, the master recording process can further contain a technique for controlling the subsequent particle size distribution. This can be done with the addition/superposition of features that control the breakage of material when stripped from the substrate. Such "control-joints," which can take the form of a grid, may provide a much tighter distribution in the particle size statistics. To the extent that control joints do not typically introduce artifacts, such as perimeter facets, such an approach may provide a better screen performance and pigment yield. Alternatively, a particle-spectrum low-pass filtering operation may be employed to strip the pigment of the small particles that harm performance.

In the event that the particle sizes are sufficiently small such that web shuffling may randomize the diffraction artifacts (e.g., with spray-painting processes), it may be possible to use the teachings herein with deterministic microstructures such as, but not limited to, periodic structures. As used herein, deterministic may be understood as reasonably and/or statistically predictable, specifically designed or as understood by one of ordinary skill in the art. Periodic structures can have uniform peak-to-valley feature heights, improving the probability that particles may retain a desired orientation. Furthermore, periodic structures can have built-in control-joints, which may substantially eliminate the need for additional process steps in the recording process. This may introduce break-points that are substantially registered with respect to the diffuser features. Deterministic microstructures can be designed to capture long-range statistics with a relatively low PFR. Further, even a single diffuser feature may provide a full representation of the desired scatter profile.

Coating of Discrete Surface Elements

A coating process of the present disclosure may provide a surface that closely approximates that of the initial continuous diffuser. Additionally, when using the averaging benefits of web shuffling, the surface produced may be similar to the initial continuous diffuser. In principle, this may be accomplished by using a relatively small number of large particles, in which the large particles may contain an adequate representation of the long-range statistics, and may be tiled on the surface with minimal overlap. The tiling with minimal overlap may substantially minimize shifts in the slope statistics due to tipping of particles, while providing high fill-factor (ratio of reflective area to total area), with substantially minimal waste of pigment. Such a surface also may have substantially minimal edge density, thus substantially maximizing PCR. While processes exist for coating very large particles, this scenario may not be practical for many conventional coating processes. In one embodiment, it may be preferred to provide a particle size range of approximately 100 microns or smaller.

Typically, the coating process may involve mixing the reflective particles into a fluid, such as the fluid 230 discussed with respect to FIG. 2. The mixture can be coated onto the substrate using any number of methods known in the art, with spray-painting being the most common. Spray painting may be more effective than printing methods for coating pigments with larger dimensions.

In conventional projection screen manufacturing, strips of a plasticized substrate, typically having a width between one and two meters, are welded together, hung, and stretched onto a frame. Spray rigs then raster the position of the gun until adequate coverage is achieved. The optical properties of the coated surface depend upon several statistical variables, which among other things include the geometrical characteristics of the particles, the volume ratio of pigment to binder ("PBR"), dilution, any additional additives such as matting agents, or flame retardants, and the detailed coating methodology. In one embodiment of the present disclosure, the coating requirements are unique, in that statistics may be determined by intra-pigment topography, and in which coating may be a deterministic process. That is, the coating process may substantially minimize the role of particle tipping statistics on the scatter profile. An exemplary embodiment of the coating process may produce a virtually continuous metal surface at the optical interface, with substantially minimal resin overcoat (to provide mechanical integrity and durability). The optical interface may be the optically functional layer of pigment or the layer that may redirect projector light to the audience, which is ideally as planar as possible. This may be achieved in wet coating using leafing metal pigments, which may float to the surface and may self-assemble into a dense planar optical interface. The dense optical interface may exist in either one of or both, in-plane (maximizing fill-factor), and in the thickness direction. Leafing pigments have a high surface tension, and thus, may not be wetted by the binder matrix and may rise to the surface. In the manufacturing of ball milled aluminum, agents such as stearic acid are often used, which typically modifies the surface tension and increases leafing. The leafing process produces high fill factor with minimal pigment, due to the tendency for particles to flow and fill gaps at the top surface. The mobility/diffusion-rate during the drying process depends upon particle size/weight.

In the limit of a large PFR, diffuser features represent surface perturbations, and as such, there is a well defined global surface normal. Any deviation of this particle surface normal from the screen substrate normal may be considered the particle tip angle, and may provide an associated slope probability density function for the coated surface. Given the random nature of coating, this is an azimuthally symmetric function that tapers smoothly from a peak in the substrate normal direction (e.g., Gaussian). According to the present disclosure, the coating process may substantially minimize the width of the particle slope probability density function, and may produce a dense stack of particles lying nominally in-plane at the surface. A particle slope probability density function of significant width may broaden the overall screen slope probability density function. Additionally, unlike (mirror-like) flat, bright, metal flake pigments which may have thickness determined primarily by the optical coating stack, the surface topography of pigment of the present disclosure may be an important aspect of the potential density achievable in the thickness direction. High density in the thickness direction at the surface may achieve one or more of the following: minimizing particle tipping, minimizing the optical contribution of the binder, and minimizing additional surface depth, which can trap light, produce shadowing, light loss, and multiple scatter events. Again, it may be preferable to obtain the desired statistics with minimal feature size, so that the effective thickness of a particle is substantially minimized.

While particle tipping may broaden the distribution of the particle slope probability density function, another mechanism, particle slump, may narrow the distribution of the particle slope probability density function. There may be a lack of separation or overlap between the diffuser feature size spectrum and that of the particle size spectrum (shown as the overlap region 450 in FIG. 4), and this may cause a significant difference between the raw diffuser ensemble statistics and the ensemble statistics of the finished screen. Each particle may have a mean surface normal vector ("MSNV") prior to stripping. The particle statistics may be preserved by preserving this angle throughout the stripping and coating processes. As a particle becomes comparable to, or smaller than, a diffuser feature, the statistics begin to take on localized characteristics. When this occurs, the probability density for the MSNV may begin to broaden, and may become the ensemble slope probability density in the small particle limit. In the large particle limit, the MSNV probability density may converge to that of the substrate normal. Between these limits, the diffuser characteristics may be substantially preserved in the web shuffling process, provided that the information contained in the MSNV spectrum is likewise preserved. With that said, the particles may "slump" when stripped from the carrier substrate and make it difficult to preserve the information contained in the MSNV spectrum.

When the MSNV spectrum is broad, it may be an indication that significant slope information may be lost in the stripping and subsequent coating process. By example, if the diffuser structure were removed from beneath each particle, the particles could tend to fall, or slump, onto the underlying substrate. The result could be a general loss in slope, and an associated narrowing of the gain profile. Following in the coating process, small particles that carried little information of their original slope could be conformal to the slope of larger underlying particles, which helps the situation. Of note, the behavior of leafing pigments in binder is not adequately described by this example. Nevertheless, the general tendency is again for a loss in gain width due to the slump phenomenon. A desirable way to address this issue may be to maintain high PFR for most or all of the particles of the ensemble. In an embodiment, the mean diffuser feature size may be in the approximate range of five to ten microns, the mean particle dimension may be in the approximate range of 70-90 microns, and minimal particle count below approximately twenty microns.

Web shuffling may be associated with spatial redistribution of particles, inversion of (statistically) 50% of the particles, and randomization of particle azimuth. In practice, web shuffling may also be accompanied by the impact of particle slope probability distribution, slump, and edge effects. The significance of the latter may depend mostly on the relative size distribution of particles to diffuser features, or PFR. When PFR is universally high, the visual appearance of a screen may be substantially determined by the scale of the diffuser features, rather than at the scale of the particle. This can be contrasted with a screen composed of flat metal leafing pigments, where the scale of the particle is the most important feature. Alternatively, the desired method for substantially homogenizing the appearance of a screen that requires primarily single reflection events to preserve polarization, may be to reduce the scale of the scattering features. Given that the particles of the present disclosure may include diffuser features that are approximately a few microns, the appearance may be more likely to resemble that of a conventional 2D matte screen. In contrast, a screen composed of a flat metal leafing pigment that is tens of microns in mean size is more likely to have a coarse granular appearance.

Web shuffling may be an effective technique for substantially homogenizing the appearance of a screen at the scale of a JRA and larger. However, at this scale and smaller, one aspect of the visual quality of a screen may concern the texture of a screen. One example of the present screen may be considered a surface that randomly (discretely) samples the projected image in reflection. From a particular viewing position relative to the screen, the vision system forms an image of this object on the retina.

In another example, the screen may be composed of a random distribution of small planar mirror facets. Depending upon random tip/tilt, each facet may steer an incident plane wave along an observation direction. If spatial sampling is sparse, then the image may appear grainy, but if the mean path between apertures is much smaller than a JRA, then the image may appear relatively smooth. In a conventional screen using flat metal leafing pigments, the mean image sampling scale is associated with the pigment size, with the mean path between samples being substantially larger (dependent upon the slope probability density function). Alternatively, the pigments of the present disclosure may provide sampling at a much smaller scale (for example, at that of the diffuser feature size). In one example of the present disclosure, a 50 micron particle may contain five micron diffuser features, and the number of samples may be 100 times that of an identical sized flat metal pigment. While these pigments may be discrete particles, the behavior may not defined by the particle perimeter (to first order), as with flat metal pigments. Additionally, second order effects may be associated with particle slope probability and particle edges. Further, the intra-particle structure may provide a robustness against particle tipping, and the contribution of edges may be somewhat decoupled.

Thus, it may be preferred that diffuser features are very small relative to the scale at which the eye can resolve structure. The scale may be either a just-resolvable-dimension ("JRD") or JRA. The latter may ensure that the perception of surface uniformity is the result of (incoherent) superposition on the retina over contributions from many reflection events. According to an exemplary embodiment, there may be a large number of such contributions from individual particles along any observation direction, thus creating a matte appearance.

The ability to discern screen texture may be limited by the angular resolving power of the vision system optics, and the sensor (retina) resolution. Normal vision may correspond to recognizing letters that subtend an angular height of five minutes of arc, with each element of the letter subtending one minute of arc. Such tests are done using media with sharp edges, black on white, in a high ambient environment. Furthermore, this test may be primarily for that part of the eye corresponding to the fovea of the retina. Outside of the zone of highest resolution, the visual acuity may fall by 50% in approximately two-degrees. Moreover, visual acuity may fall in reduced ambient lighting environments. The current cinema brightness standard is 14 fl for 2D presentation, and as low as 4.5 fl for 3D presentation, so visual acuity may significantly degrade due to increased aberrations as the pupil dilates. Finally, visual acuity may be a function of contrast. Subtle random modulation in intensity may be more difficult to resolve than periodic black/white bars. Since the peak sensitivity of the eye is at a low spatial frequency of two to three cycles/degree, a just-resolvable spatial frequency (associated with a JRA) shifts long as the modulation depth is decreased. At approximately 100% sinusoidal modulation, it may be possible to resolve approximately 7 mm at about 12 meters distance, but at approximately 10% modulation, the resolution may degrade to approximately 13 mm, and at approximately 2% modulation, the resolution may degrade to approximately 50 mm. Given the nature of random screen non-uniformities, it is thus reasonable to assume that a JRA of screen surface may be between approximately one and five centimeters at a typical cinema viewing distance. At dimensions smaller than a JRA, there may be a spatial averaging that occurs, associated with the sensitivity weighted modulation transfer function (MTF) of the vision system.

In another exemplary embodiment, web shuffling may be leveraged specifically to produce a desired scatter profile via azimuth averaging. An asymmetric scatter profile, when azimuth averaged, can be used to shape the scatter profile on the scale of a JRA. However, the azimuth dependence can be pronounced and thus affect a significant influence on the uniformity of the scatter profile, a larger ratio of JRA to particle size may be required to avoid texture issues. An analogous situation may exist when there is significant spatial variation in the scatter profile of the source substrate, or when two types of particles are mixed to produce desired spatial-averaged scatter profiles. In one exemplary embodiment, two distinct types of particles may be manufactured, with multiple products being defined by the mixing ratio. For instance, a mid-range profile can be produced by the appropriate mixture of high-gain and low-gain particles.

Figure 6:
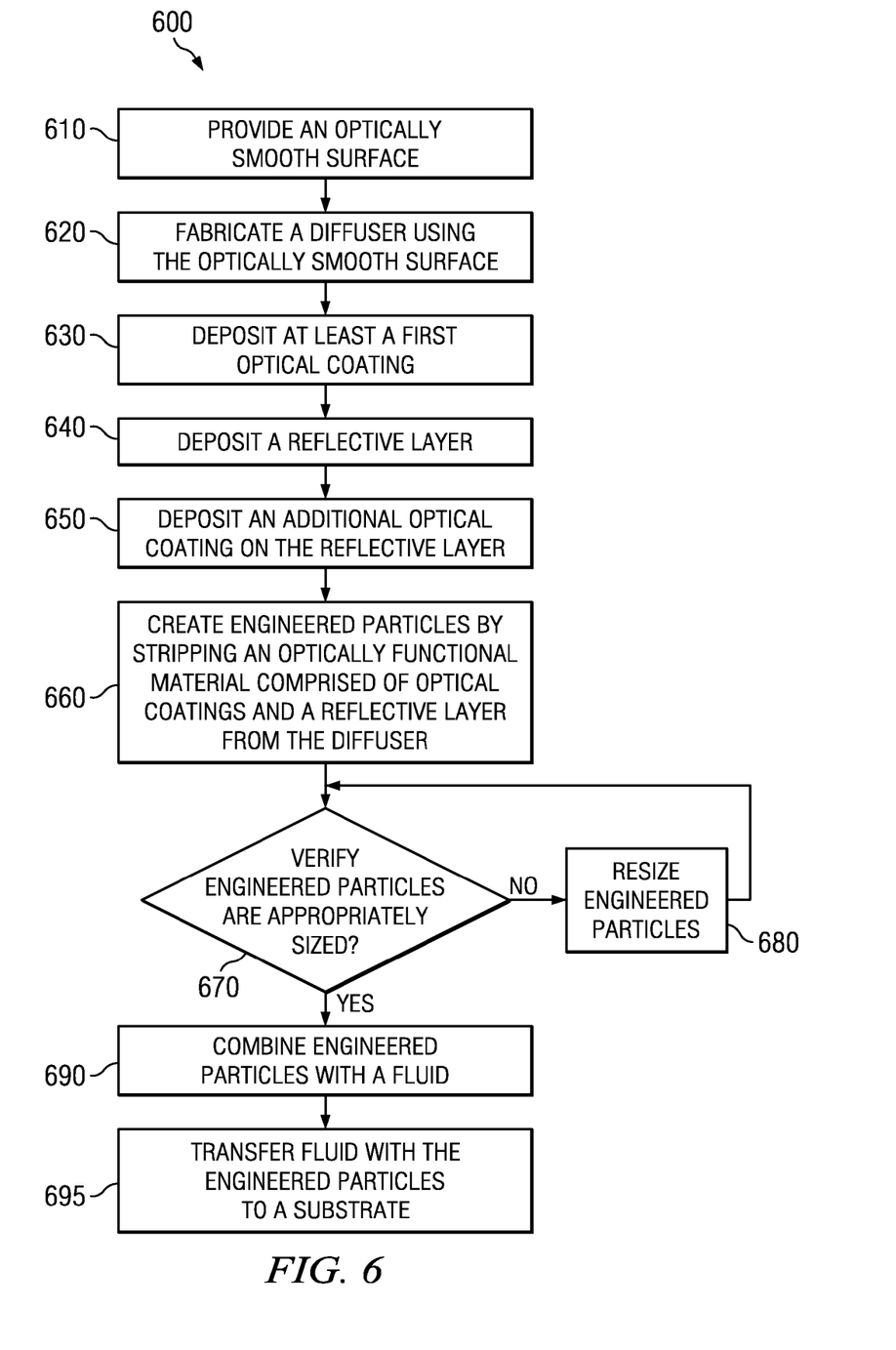
FIG. 6 is a flowchart illustrating operations of one embodiment of a method for providing a projection screen, in accordance with the present disclosure.

FIG. 6 is a flowchart illustrating operations of one embodiment of a method 600 for providing a projection screen. Although the flowchart includes operations in a specific order, it may be possible to perform the operations in a different order, and it also may be possible to omit operations as necessary. The flow chart may begin with the operation of block 610, in which an optically smooth surface may be provided. As previously discussed, the optically smooth surface may be provided using a manufacturing tool with a predetermined topography. Next, in the operation of block 620, the diffuser may be fabricated using the optically smooth surface. The diffuser may be diffuser roll-stock and may be fabricated using any number of processes such as roll-to-roll UV embossing.

In the operation of block 630, at least a first optical coating may be deposited on the diffuser. The first optical coating may be a release coating. A second optical coating may also be deposited subsequent to the first optical coating or may also be deposited adjacent to the diffuser in the absence of the first optical coating. The release coating may facilitate a subsequent stripping processed described herein, between the second optical coating and the diffuser. The second optical coating may be a dielectric material such as, but not limited to, $SiO_x$, $MgF_2$, and so on. Additionally, as discussed with respect to FIG. 3, the dielectric may be deposited in such a way as to crack along random contours of the diffuser structure. Alternatively, in one embodiment and as previously discussed, the dielectric material may crack along "control-joints," which may take the form of grid-like features introduced into the diffuser structure.

In the operation of block 640, a reflective layer may be deposited on the second coating. The reflective layer may be a metal layer such as aluminum, but may be any type of highly reflective coating. Next, in the operation of block 650, an additional optical coating may be deposited on the reflective layer. The additional optical may be a dielectric layer such as, but not limited to, $SiO_x$, $MgF_2$, and so on. The second optical coating and the additional optical coating may form a sandwich structure. For example, the two optical coatings may be coated on both sides of the reflective layer.

In the operation of block 660, engineered particles may be created by stripping an optically functional material comprised of the second optical coating, the reflective layer and the additional optical coating. Stripping the optically function material may be achieved by any number of processes such as, but not limited to, immersing the film in a solvent ultrasonic bath. The engineered particles that may be created in the stripping process may be too large to use in the coating process and this may be verified in the operation of block 670. In the operation of block 670, the engineered particles may be evaluated to verify whether the size falls within a predetermined size range. In the event the engineered particles are too large, the engineered particles may be resized, as shown in the operation of block 680, and then re-evaluated again as described with respect to the operation of block 670. In the event the engineered particles do fall within the predetermined size range, in the operation of block 690, the engineered particles may be combined with a fluid. As discussed with respect to FIG. 2, the fluid may include a transparent binder resin such as, but not limited to PVC resin, enamel, polyurethane, acrylic, lacquer, and the like, and/or some form of dilution. The fluid may function as a carrier for the engineered particles. Next, in the operation of block 695, the fluid and the engineered particles may be transferred to a substrate in a coating process. The coating process may include spray painting or any spray and/or printing method known in the art.

As may be used herein, the terms "substantially," "substantially approximate(s)," "substantially minimize(s)," and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A web shuffling method for providing a projection screen, the method comprising:
    generating optically functional material from a carrier substrate by breaking the optically functional material into individual engineered particles; and
    distributing a coating onto a second substrate to create a desired optical characteristic, wherein the coating includes the individual engineered particles.

2. The method of claim 1, further comprising fabricating a base diffuser material, wherein the base diffuser material is adjacent to the optically functional material.

3. The method of claim 2, wherein fabricating the base diffuser material further comprises holding a predetermined tolerance, further wherein the predetermined tolerance is based on at least a difference between long-range statistics and ensemble statistics.

4. The method of claim 2, wherein distributing the coating provides a surface that substantially approximates that of the base diffuser material.

5. The method of claim 1, wherein distributing the coating is operable to substantially minimize the role of particle tipping statistics on the scatter profile of the coating.

6. The method of claim 1, wherein distributing the coating further comprises producing a dense stack of the individual engineered particles lying substantially in-plane at the surface of the coating.

7. The method of claim 1, further comprising maintaining a high particle-to-feature ratio for the individual engineered particles.

8. A projection screen with an engineered appearance that is achieved through web shuffling, the projection screen comprising:
    a substrate; and
    a coating adjacent to the substrate, the coating comprising engineered particles created by breaking an optically functional material into particles by separating the optically functional material from a carrier substrate, wherein the engineered particles are operable to primarily determine the scattering behavior of light and to create a desired optical characteristic.

9. The projection screen of claim 8, wherein the carrier substrate is a sacrificial carrier substrate.

10. The projection screen of claim 8, wherein the morphology of the engineered particles may be operable to primarily, statistically determine the macroscopic scatter behavior of the projection screen.

11. The projection screen of claim 8, wherein the coating further comprises a surface operable to decouple the scatter profile from the polarization contrast ratio of the projection screen.

12. The projection screen of claim 8, wherein the optically functional material is produced using a diffuser.

13. The projection screen of claim 12, wherein the diffuser is adjacent to the carrier substrate.

14. The projection screen of claim 12, wherein the optically functional material further comprises at least a first optical coating.

15. The projection screen of claim 14, wherein the first optical coating is adjacent to the diffuser prior to stripping the optically functional material from the carrier substrate.

16. The projection screen of claim 14, wherein the first optical coating is a release layer.

17. The projection screen of claim 8, wherein the optically functional material further comprises at least a second optical coating.

18. The projection screen of claim 17, wherein the second optical coating is a dielectric coating.

19. The projection screen of claim 17, wherein the second optical coating is adjacent to the diffuser prior to stripping the optically functional material from the carrier substrate.

20. The projection screen of claim 8, further comprising a reflective layer.

21. The projection screen of claim 20, wherein the reflective layer is substantially composed of aluminum.

22. The projection screen of claim 20, wherein the optically functional material further comprises a third optical coating adjacent to the reflective layer.

23. The projection screen of claim 22, wherein the third optical coating is a dielectric coating.

24. The projection screen of claim 8, wherein the engineered particles further comprise a sandwich structure, wherein the sandwich structure includes a plurality of optical coatings on at least a first side of a reflective layer.

25. The projection screen of claim 8, wherein the engineered particles are within a predetermined size range.

26. The projection screen of claim 25, wherein the engineered particles are resized if the engineered particles are outside the predetermined size range.

27. The projection screen of claim 8, further comprising a fluid, wherein the fluid is combined with the engineered particles.

28. The projection screen of claim 27, wherein the fluid combined with the engineered particles is deposited onto a substrate.

29. A method for providing a projection screen, the method comprising:
creating engineered particles from the optically functional material by separating the optically functional material from a first carrier substrate; and
depositing the engineered particles on a second substrate to create an engineered appearance of the projection screen and to create a desired optical characteristic.

30. The method of claim 29, further comprising utilizing a diffuser to provide the optically functional material, wherein the diffuser is adjacent to the first carrier substrate.

31. The method of claim 29, further comprising depositing at least a first optical coating, wherein the first optical coating is adjacent to the diffuser.

32. The method of claim 31, further comprising depositing a second optical coating.

33. The method of claim 32, wherein the second optical coating is a dielectric coating.

34. The method of claim 32, wherein the first optical coating is a release layer.

35. The method of claim 29, further comprising depositing a reflective layer.

36. The method of claim 35, wherein the reflective layer is substantially composed of aluminum.

37. The method of claim 35, further comprising depositing a third optical coating adjacent to the reflective layer.

38. The method of claim 36, wherein the third optical coating is a dielectric coating.

39. The method of claim 29, further comprising creating the optically functional material by forming a sandwich structure, wherein the sandwich structure includes optical coatings on at least a first side of a reflective layer.

40. The method of claim 29, further comprising verifying the engineered particles are approximately within a predetermined size range.

41. The method of claim 40, wherein verifying the engineered particles further comprises resizing the engineered particles when the engineered particles are not approximately within the predetermined size range.

42. The method of claim 29, further comprising combining the engineered particles with a fluid.

43. The method of claim 29, further comprising depositing the fluid with the engineered particles onto a substrate.

44. A projection system comprising:
a projection screen with an engineered appearance that is achieved through web shuffling, the projection screen comprising a substrate and a coating adjacent to the substrate, the coating comprising engineered particles created by breaking an optically functional material into particles by separating the optically functional material from a carrier substrate, wherein the coating is operable to create a desired optical characteristic; and
a light projection system directing light in the direction of the projection screen.

* * * * *